(12) United States Patent
Yeom et al.

(10) Patent No.: US 10,032,313 B2
(45) Date of Patent: Jul. 24, 2018

(54) HEAD-MOUNTED DEVICE AND METHOD OF ENABLING NON-STATIONARY USER TO PERFORM 3D DRAWING INTERACTION IN MIXED-REALITY SPACE

(71) Applicant: Center of Human-Centered Interaction for Coexistence, Seoul (KR)

(72) Inventors: Ki Won Yeom, Paju-si (KR); Joung Huem Kwon, Seoul (KR); Ji Yong Lee, Seoul (KR); Bum Jae You, Seoul (KR)

(73) Assignee: Center of Human-Centered Interaction for Coexistence (KR)

( * ) Notice: Subject to any disclaimer, the term of this patent is extended or adjusted under 35 U.S.C. 154(b) by 0 days.

(21) Appl. No.: 15/171,054

(22) Filed: Jun. 2, 2016

(65) Prior Publication Data

US 2016/0358380 A1     Dec. 8, 2016

(30) Foreign Application Priority Data

Jun. 5, 2015  (KR) .......................... 10-2015-0080184

(51) Int. Cl.
*G09G 5/00* (2006.01)
*G06T 19/00* (2011.01)
*G06F 3/01* (2006.01)
*G02B 27/01* (2006.01)

(52) U.S. Cl.
CPC ............ *G06T 19/006* (2013.01); *G02B 27/01* (2013.01); *G02B 27/017* (2013.01); *G06F 3/012* (2013.01); *G06F 3/013* (2013.01); *G02B 2027/014* (2013.01); *G02B 2027/0138* (2013.01); *G02B 2027/0187* (2013.01)

(58) Field of Classification Search
CPC ........................ G02B 2027/0187; G06F 3/013
See application file for complete search history.

(56) References Cited

U.S. PATENT DOCUMENTS

2015/0309316 A1* 10/2015 Osterhout ............... G06F 1/163
345/8

FOREIGN PATENT DOCUMENTS

| JP | 2014170374 A | 9/2014 |
| KR | 101386248 B1 | 4/2014 |
| KR | 1020150040580 A | 4/2015 |
| WO | WO2014083369 A1 | 6/2014 |

* cited by examiner

*Primary Examiner* — Thomas Lett
(74) *Attorney, Agent, or Firm* — Mendelsohn Dunleavy P.C.

(57) ABSTRACT

A head-mounted device (HMD) for enabling a 3D drawing interaction in a mixed-reality space is provided. The HMD includes a frame section, a rendering unit providing a specified image, a camera unit attached to the frame section to pick up an image for rendering, and a control unit configured to, when the camera unit picks up an image of a specified marker, perform a calibration process based on position information of the image of the marker displayed on a screen of the HMD and to, when there is a motion of an input device for interaction with a virtual whiteboard, obtain position information of an image of the input device displayed on a virtual camera screen based on position information of the whiteboard.

20 Claims, 4 Drawing Sheets

Image viewed by user

HEAD-MOUNTED DEVICE AND METHOD OF ENABLING NON-STATIONARY USER TO PERFORM 3D DRAWING INTERACTION IN MIXED-REALITY SPACE

BACKGROUND OF THE INVENTION

Field of the Invention

The present invention relates generally to a head-mounted device (HMD) and method of enabling a 3D drawing interaction in a mixed-reality space. More particularly, the present invention relates to a device and method for enabling a non-stationary user to freely perform a 3D interaction, such as writing, drawing, etc., in a virtual space provided through a head-mounted device (HMD).

Description of the Related Art

Technologies of providing an interaction between a user and a virtual space through perception of a user's motion have recently appeared. Korean Patent No. 10-1386248 discloses the technology of providing a user with an interaction method via a display using a camera attached thereto. The technology, however, has a problem in that, since the camera is attached to the display opposite the user, the user can only interact within a field of view (FOV) of the camera. Thus, if the user moves out of the FOV, the user cannot perform an interaction, such as drawing, writing or the like, in a virtual space. In this case, for example, a problem may occur where the user's motion is only partially perceived or is not perceived at all, so the interaction gesture, such as drawing a picture, is only partially captured by the camera or is not captured at all.

Thus, there is a need to develop a technology of supporting a non-stationary user interacting with a mixed reality environment.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to solve the problems of the related art.

Another object of the present invention is to enable a user to freely interact with an environment of both a mixed reality space and a real space even when the user moves, through a 3D visualization system or a camera unit attached to a common display device.

A further object of the present invention is to enable a user to view a real environment and a virtual environment while providing the user with 3D rendering information irrespective of a distance and a direction, through a camera unit attached to a user's sub-visualization system, with the camera unit aligned with user's eyes.

In order to achieve the above objects, according to one aspect of the present invention, there is provided a head-mounted device (HMD) for enabling a non-stationary user to freely perform a 3D interaction, such as writing, drawing, etc., in a virtual space provided through a head-mounted device (HMD), the HMD including: a frame section capable of being worn around a user's head or face; a rendering unit providing a specified image; a camera unit attached directly or indirectly to the frame section so as to pick up an image for rendering; and a control unit configured to, when the camera unit picks up an image of a specified marker, perform a calibration process based on position information of the image of the marker displayed on a screen of the HMD, the position information being obtained based on position information of user's eyes, position information of the screen of the HMD, position information of the camera unit, and position information of the marker, and to, when there is a motion of an input device for interaction with a virtual whiteboard provided through the rendering unit after the calibration process is performed, obtain position information of an image of the input device displayed on a virtual camera screen corresponding to the camera unit based on position information of the whiteboard, thereby supporting the interaction with the whiteboard.

According to another aspect of the present invention, there is provided a method of enabling a non-stationary user to perform a 3D drawing interaction in a mixed-reality space, using a head-mounted device (HMD) worn by the user, the method including: at a control unit of the HMD, (a), when a camera unit attached directly or indirectly to the HMD picks up an image of a specified marker for rendering, performing or supporting a calibration process based on position information of the image of the marker displayed on a screen of the HMD, the position information being obtained based on position information of user's eyes, position information of the screen of the HMD, position information of the camera unit, and position information of the marker; and (b) when there is a motion of an input device for interaction with a virtual whiteboard provided through a rendering process after the calibration process is performed, obtaining position information of an image of the input device displayed on a virtual camera screen corresponding to the camera unit based on position information of the whiteboard, thereby supporting the interaction with the whiteboard.

According to the present invention, a user can freely interact with an environment of both a mixed-reality space and a real space even when the user moves, through a 3D visualization system or a camera attached to a common display device.

Further, according to the present invention, a user can view a real environment and a virtual environment while being informed of 3D rendering information irrespective of a distance and a direction, through a camera attached to a user's sub-visualization system, with the camera aligned with user's eyes.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
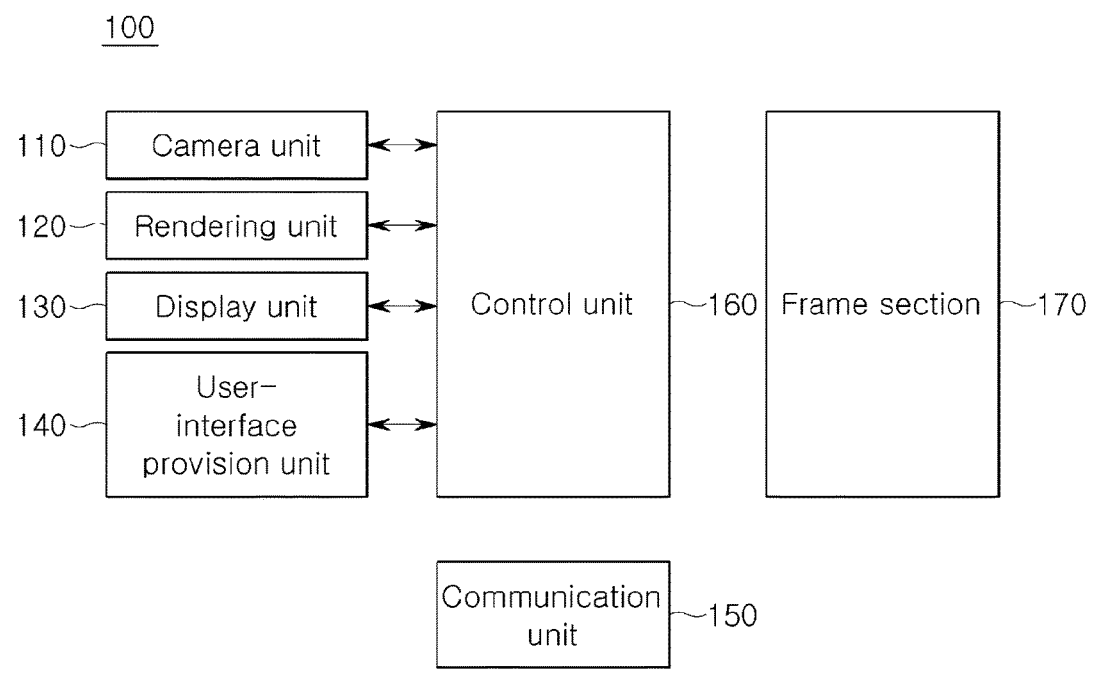
FIG. 1 is a view illustrating the configuration of a head-mounted device (HMD) supporting a 3D drawing interaction in a virtual space according to an embodiment of the present invention.

Reference will now be made in greater detail to exemplary embodiments of the invention, an example of which is illustrated in the accompanying drawings. These embodiments are described in detail such that a person skilled in the art can sufficiently implement those embodiments through the description. It is noted that, although being different from each other, various embodiments are not required to be necessarily mutually exclusive. For example, specified shapes, structures, and features of an embodiment described herein may be implemented into other embodiments without departing from the spirit and scope of the present invention. Further, it should be understood that positions or arrangements of individual elements in respective disclosed embodiments may be changed into other positions or arrangements without departing from the spirit and scope of the present invention. Accordingly, the following description is not intended to be limitative, and if appropriately described, the scope of the present invention is only defined by the appended claims and equivalents thereof. In the figures, like reference numerals refer to the same or similar functions throughout many aspects.

Hereinafter, preferred embodiments of the present invention will be described in detail with reference to the accompanying drawings in order to allow an ordinary skilled person in the art to which the present invention pertains to easily implement the invention.

FIG. 1 is a view illustrating the configuration of a head mounted device (HMD) supporting a 3D drawing interaction in a virtual space according to an embodiment of the present invention.

As illustrated in FIG. 1, the HMD 100 according to the embodiment of the present invention includes a camera unit 110, a rendering unit 120, a display unit 130, a user-interface provision unit 140, a communication unit 150, a control unit 160, and a frame section 170.

The frame section 170 may have a shape suitable to be wearable around a user's head or face. The frame section may be formed like eyeglasses, a helmet, or the like without limitation thereto. In an embodiment, an HMD 100 having an eyeglasses-type frame section 170 will be described as an example.

At least some of the camera unit 110, the rendering unit 120, the display unit 130, the user-interface provision unit 140, the communication unit 150, and the control unit 160 may be installed directly or indirectly to the outside or inside of the frame section 170.

The camera unit 110 may pick up an image for use in rendering. The image picked up by the camera unit 110 may be an image that is picked up in the same or similar direction as or to a direction toward which a user wearing the HMD 100 gazes at. The picked-up images are treated with a rendering process by the rendering unit 120 and then are provided to the user through the display unit 130. Here, the camera unit 110 may be installed directly or indirectly to the frame section 170 such that it can pick up an image of the front side in a direction identical or similar to the direction toward which the user wearing the HMD 100 gazes at. This will be further described with reference to FIG. 2.

The image picked-up by the camera unit 110 may be an image that is picked up with reference to a motion of the user wearing an input device 300 illustrated in FIG. 5, and the image is also treated by the rendering process by the rendering unit 120 and then is provided to the user through the display unit 130.

The rendering unit 120 may provide a certain image to the user. The certain image is an image that is obtained by rendering, by the rendering unit 120, at least one of an image corresponding to a real space, picked up by the camera unit 110, and an image corresponding to a motion of the input device 300 and the user wearing the input device. The rendering image may be transmitted to the display unit 130 by the camera unit 110 or the control unit 160 so that the user can see that image through the display unit.

The rendering unit 120 may perform the rendering on an image corresponding to a virtual whiteboard 200 to be described later, to allow the user to see the rendering image through the display unit 130. Referring to FIG. 5, the whiteboard 200 is a virtual whiteboard that is provided by the rendering unit 120 and is provided to the user through the display unit 130. The virtual whiteboard serves as a screen for interaction with the user wearing the input device 300. Here, when the user wearing the input device 300 moves his/her body on the whiteboard 200, force feedback is provided through the input device 300, thereby allowing the user to feel his/her palpable drawing action performed on the whiteboard 200. Here, the input device 300 may be associated with the HMD 100 via the communication unit 150. The rendering unit 120 can allow the image corresponding to the whiteboard 200 to be displayed on a position corresponding to that of the image corresponding to the input device 300 in the image that the user sees through the HMD 100, for efficient interaction between the input device 300 of the user and the whiteboard 200.

The display unit 130 serves to provide the user with the rendering image and may be installed directly or indirectly to lenses of the eyeglasses-type HMD 100 according to an embodiment of the present invention.

The user-interface provision unit 140 may serve to scale an image that a user sees, and may be physically provided on the HMD 100, or virtually provided in a virtual space provided by the HMD 100.

The control unit 160 may support an interaction between the input device 300 and the whiteboard 200 by, when the camera 110 picks up an image of a specified marker (not shown, an object such as a black-color, square-plane pattern, configured as an image character easily perceivable with a computer vision technique); performing a calibration process based on position information of the image of the marker displayed on the screen of the HMD 100, the position information being obtained based on position information of user's eyes, position information of the screen of the HMD 100, position information of the camera unit 110, and position information of the marker; and, when there is a motion of the input device 300 for interaction with a virtual whiteboard 200 provided through the rendering unit 120, obtaining position information of an image of the input device 300 displayed on a virtual camera screen corresponding to the camera unit 110 based on position information of the whiteboard 200, thereby supporting the interaction between the input device 300 and the whiteboard 200.

Here, the screen of the HMD 100 means a real or virtual screen onto which an image provided to the user through the HMD 100 is perspectively projected, and the camera screen corresponding to the camera unit 110 means a virtual screen onto which an image picked-up by the camera unit 110 is perspectively projected.

The calibration process means a process that matches a virtual space provided to the user through the HMD 100 with a real space in which the user exists. The calibration process is obtained by matching the coordinate system of the virtual space with the coordinate system of the real space, which will be described in detail with reference to FIG. 3. For reference, the calibration process may be carried out by the control unit 160 or an external terminal (not shown) associated with the HMD 100.

The control unit 160 may communicate with the external terminal (not shown) via the communication unit 130.

Figure 2:
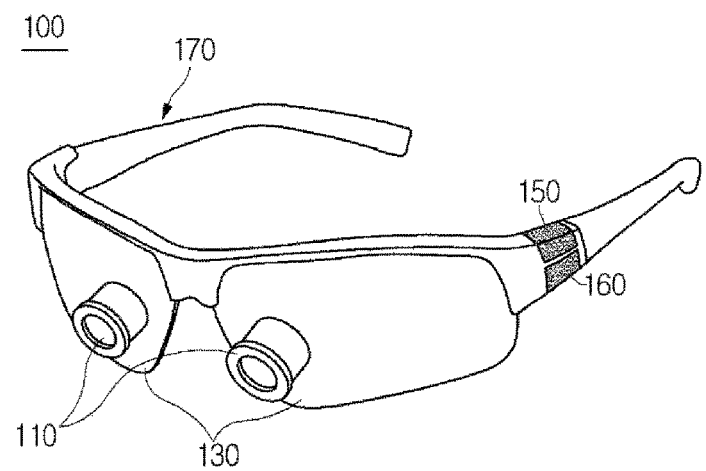
FIG. 2 is a view illustrating an eyeglasses-type HMD according to an embodiment of the present invention.

FIG. 2 is a view illustrating an eyeglasses-type HMD 100 according to an embodiment of the present invention. For reference, although the "eyeglasses-type" HMD has been illustrated in the drawings or the like, the present invention is not essentially limited thereto, but may adopt conventional head mounted smart glasses or a mobile visualization device similar thereto or providing a similar function (e.g., a mobile phone equipped with an additional camera, a two-camera equipped mobile phone, an RGB-D camera-equipped device, or the like).

Referring to FIG. 2, the frame section 170 of the HMD 100 may be formed like eyeglasses to which a display unit 130 formed like lenses may be fixedly or detachably attached, and the communication unit 150 and the control unit 160 may be coupled to a certain position thereof. Although the communication unit 150 and the control unit 160 are illustrated as being coupled to leg portions of the eyeglasses-type frame section 170 in an embodiment of the present invention, the present invention is not limited thereto.

Although FIG. 2 shows that camera units 110 are installed directly or indirectly onto left and right lenses of the eyeglasses-type HMD 100, respectively, in order to match the positions of user's eyes with the positions of the camera units 110, they may be installed onto the frame section 170 above the display unit 140. Then, the camera units 110 can pick up an image of a front side in a direction toward which a user gazes. Further, even when the user wearing the HMD 100 moves, the camera unit 110 also moves to correspond to the motion of the user. Thus, a space range for which the user can interact with the virtual space through the input device 300 can be extended. To this end, however, a calibration process should be previously performed using markers, and this will be described later with reference to FIG. 3.

In the meantime, although the camera unit 110 has adopted a stereoscopic camera in the embodiment, the present invention is not limited thereto, and may adopt a web camera or an RGB-D camera without limitation thereto.

Figure 3:
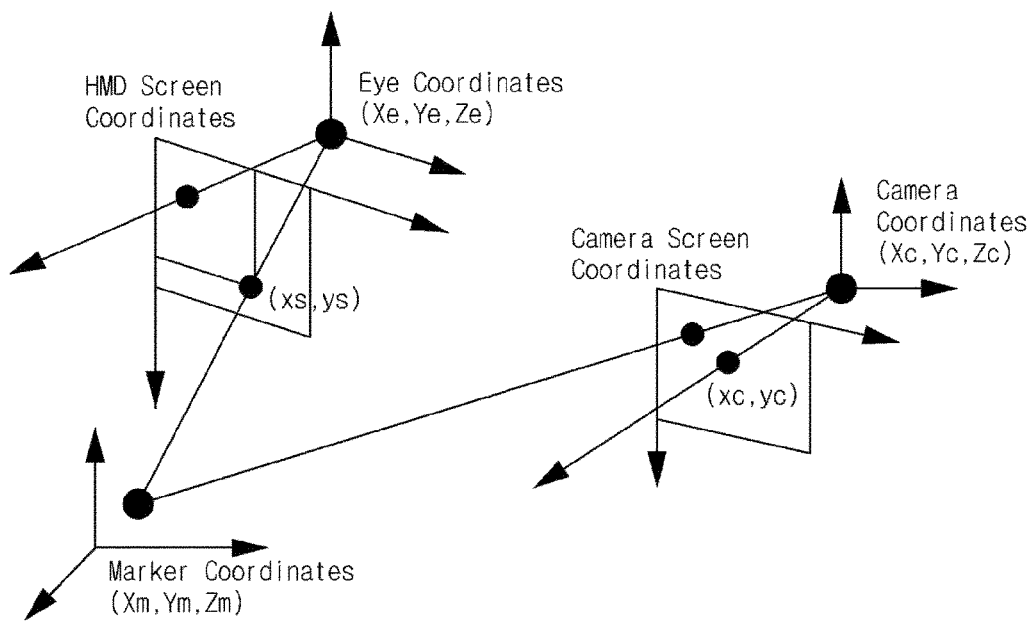
FIG. 3 is a view illustrating the coordinate systems used in performing a calibration process for the HMD according to an embodiment of the present invention.

FIG. 3 is a view illustrating the coordinate systems used in performing a calibration process for the HMD according to an embodiment of the present invention. Although FIG. 3 illustrated that the calibration process is performed by the control unit 160 of the HMD 100, the calibration process may be performed by an external terminal (not shown) operatively associated with the HMD 100.

Referring to FIG. 3, the control unit 160 for performing the calibration process for matching the coordinate system of a virtual space provided through the HMD 100 with the coordinate system of a real space in which a user exists can perform the calibration process using camera coordinates corresponding to the camera unit 110 installed onto the HMD 100, camera screen coordinates corresponding to a virtual screen onto which an image picked-up by the camera unit 110 is perspectively projected, eye coordinates corresponding to user's eyes, HMD screen coordinates corresponding to an image output to the HMD 100, marker coordinates corresponding to markers picked-up by the camera unit 110, and the like. For reference, (Xc, Yc, Zc), (xc, yc), (Xe, Ye, Ze), (xs, ys), and (Xm, Ym, Zm) respectively show the coordinates of the above-mentioned coordinate systems.

Figure 4:
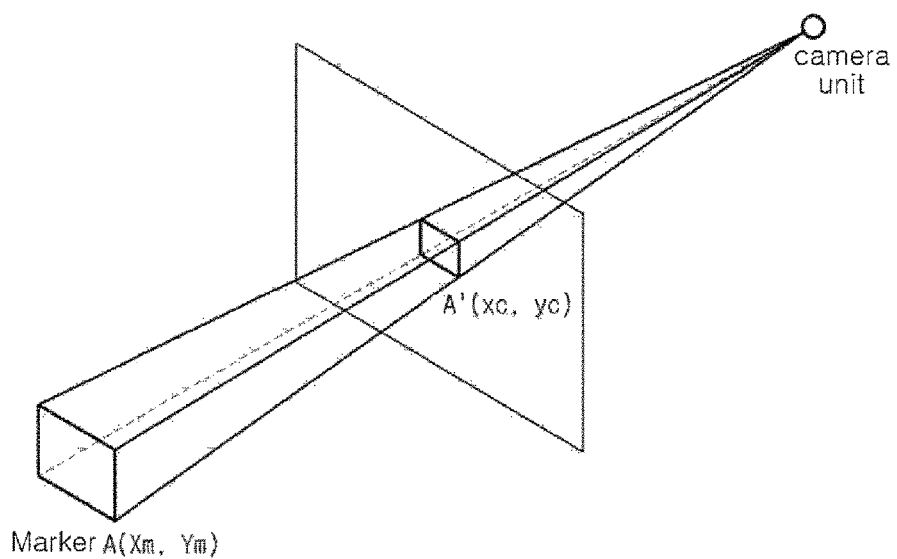
FIG. 4 is a view illustrating the coordinates A(Xm, Ym) of a point A of a marker in a real space and the coordinates A'(xc, yc) of a point A' of the marker projected on a virtual screen.

The size of an image of a marker picked up by the camera unit 110 and projected onto a screen of the camera unit may be different from that of a marker in a real space, and physical positions of the coordinates may also be different. For example, referring to FIG. 4, assuming that the coordinates of a vertex A in a real space are A (Xm, Ym, Zm), the coordinates of the vertex A projected onto a virtual screen may be A' (xc, yc). Thus, the control unit 160 can serve to allow an image of a picked-up marker to be projected in position onto a screen of the camera unit by performing the calibration process among the marker coordinate system, the camera coordinate system, and the camera screen coordinate system. Further, the control unit 160 can serve to allow an image picked-up by the camera unit 110 to be automatically displayed in position on the image viewed by a user through the HMD 100 by performing the calibration process among the camera coordinate system, the eye coordinate system, and the HMD screen coordinate system.

The control unit 160 may be perform the calibration process between the marker in a real space and the camera unit 110 in order to perform the calibration process between the virtual space provided through the HMD 100 and the real space. Here, rotation and translation relations between the marker coordinate system and the camera coordinate system may be used.

The rotation and translation relations between the marker coordinate system and the camera coordinate system are expressed in a transform matrix by Equation 1. Tcm indicates rotation and translation transforms between the marker coordinate system and the camera coordinate system.

$$\begin{bmatrix} X_c \\ Y_c \\ Z_c \\ 1 \end{bmatrix} = \begin{bmatrix} V_{11} & V_{12} & V_{13} & W_x \\ V_{11} & V_{12} & V_{13} & W_y \\ V_{11} & V_{12} & V_{13} & W_z \\ 0 & 0 & 0 & 1 \end{bmatrix} \quad \text{Equation 1}$$

$$\begin{bmatrix} X_m \\ Y_m \\ Z_m \\ 1 \end{bmatrix} = \begin{bmatrix} V_{3\times 3} & W_{3\times 1} \\ 0 \quad 0 \quad 0 & 1 \end{bmatrix} \begin{bmatrix} X_m \\ Y_m \\ Z_m \\ 1 \end{bmatrix} = T_{cm} \begin{bmatrix} X_m \\ Y_m \\ Z_m \\ 1 \end{bmatrix}$$

Further, the control unit 160 may perform a calibration process between a marker in a real space and an image of the marker projected onto the camera screen. Here, the perspective projection relation between the marker coordinate system and the camera screen coordinate system, shown in FIG. 4, may be used.

That is, a point A of an image of the marker in a real space and a point A' projected onto a virtual screen are in the perspective projection relation, which may be expressed in a matrix pattern using P transform indicative of a common perspective projection relation.

Thus, the relation among the marker coordinate system, the camera coordinate system, and the camera screen coordinate system can be expressed by Equation 2 using Equation 1 and P transform. The control unit 160 can perform the calibration process using Equation 2. In Equation 2, vd indicates degree of scaling of an image of a marker being formed onto the camera screen.

$$\begin{bmatrix} vd \cdot xc \\ vd \cdot yc \\ vd \\ 1 \end{bmatrix} = P \begin{bmatrix} X_c \\ Y_c \\ Z_c \\ 1 \end{bmatrix} = P \begin{bmatrix} V_{11} & V_{12} & V_{13} & V_x \\ V_{21} & V_{22} & V_{23} & V_y \\ V_{31} & V_{32} & V_{33} & V_z \\ 0 & 0 & 0 & 1 \end{bmatrix} \begin{bmatrix} X_m \\ Y_m \\ Z_m \\ 1 \end{bmatrix} \quad \text{Equation 2}$$

The perspective projection relation between the eye coordinate system and the HMD screen coordinate system can be expressed by Equation 3 using the above-mentioned method. In Equation 3, Qse indicates a perspective projection transform from the HMD screen coordinate system into the eye coordinate system, hd indicates degree of scaling of an image displayed on a screen of the HMD 100.

$$\begin{bmatrix} hd \cdot xs \\ hd \cdot ys \\ hd \\ 1 \end{bmatrix} = Q_{se} \begin{bmatrix} X_e \\ Y_e \\ Z_e \\ 1 \end{bmatrix} \quad \text{Equation 3}$$

Using transform Tec for rotation and translation relations between the eye coordinate system and the camera coordinate system expressed by Equation 3, Equation 4 can be obtained according to the matrix chain rule.

$$\begin{bmatrix} hd \cdot xs \\ hd \cdot ys \\ hd \\ 1 \end{bmatrix} = Q_{se} \begin{bmatrix} X_e \\ Y_e \\ Z_e \\ 1 \end{bmatrix} = Q_{se} T_{sc} \begin{bmatrix} X_c \\ Y_c \\ Z_c \\ 1 \end{bmatrix} \quad \text{Equation 4}$$

Using Equations 1 and 4 indicating the above-defined rotation and translation relations between the marker coordinate system and the camera coordinate system, the relation among the marker coordinate system, the camera coordinate system, eye coordinate system, and the HMD screen coordinate system can be expressed by Equation 5, with which the calibration process may be performed by the control unit 160.

$$\begin{bmatrix} hd \cdot xs \\ hd \cdot ys \\ hd \\ 1 \end{bmatrix} = Q_{se} \begin{bmatrix} X_e \\ Y_e \\ Z_e \\ 1 \end{bmatrix} = Q_{se} T_{sc} \begin{bmatrix} X_c \\ Y_c \\ Z_c \\ 1 \end{bmatrix} = Q_{se} T_{sc} T_{cm} \begin{bmatrix} X_m \\ Y_m \\ Z_m \\ 1 \end{bmatrix} \quad \text{Equation 5}$$

For reference, when an image of a marker is displayed onto a screen of the HMD 100, the HMD 100 can support a user to set information on a ratio hd (which is referred to as a first ratio in claims) of the size of a marker to the size of an image of the marker displayed onto the screen of the HMD 100 through the user-interface provision unit 140, and can determine a position of the image of the marker displayed onto the screen of the HMD 100, based on the information on hd determined by the user-interface provision unit 140.

In the meantime, after performing the calibration process using the marker as in Equation 5, the user performs a gesture or motion simulating, for example, writing or drawing, with respect to a virtual whiteboard 200 corresponding to a certain region in a virtual space in front of the user, through the input device 300, so the control unit 160 may additionally perform the calibration process between the whiteboard coordinate system corresponding to the virtual whiteboard 200 and the camera screen coordinate system onto which the input device 300 is projected.

Using the above-mentioned P transform and transform Tcw for rotation and translation relations between the camera screen coordinate system and the whiteboard coordinate system, the calibration between among the whiteboard coordinate system, the camera coordinate system, and the camera screen coordinate system can be derived as Equation 6, with which the calibration between the whiteboard coordinate system and the camera screen coordinate system may be performed by the control unit 160 using Equation 6. In Equation 6, vd indicates degree of scaling of an image projected onto the camera screen, and it may be the same as vd of Equation 1.

$$\begin{bmatrix} vd \cdot xc \\ vd \cdot yc \\ vd \\ 1 \end{bmatrix} = \quad \text{Equation 6}$$

$$P \begin{bmatrix} X_c \\ Y_c \\ Z_c \\ 1 \end{bmatrix} = P \begin{bmatrix} V_{11} & V_{12} & V_{13} & W_x \\ V_{21} & V_{22} & V_{23} & W_y \\ V_{31} & V_{32} & V_{33} & W_z \\ 0 & 0 & 0 & 1 \end{bmatrix} \begin{bmatrix} X_w \\ Y_w \\ Z_w \\ 1 \end{bmatrix} = PT_{cw} \begin{bmatrix} X_w \\ Y_w \\ Z_w \\ 1 \end{bmatrix}$$

Here, since an image corresponding to the input device 300 may be projected onto the camera screen, a relative position between the whiteboard 200 and the input device 300 can be calibrated by the control unit 160 performing the calibration between the whiteboard coordinate system and the camera screen coordinate system.

For reference, when an image of the input device 300 is displayed onto a virtual camera screen corresponding to the camera unit 110, the HMD 100 can support a user to set information on a ratio vd (which is referred to as a second ratio in claims) of the size of the input device 300 to the size of an image of the input device 300 displayed onto the camera screen through the user-interface provision unit 140, and can determine a position of the image of the input device 300 displayed onto the camera screen corresponding to the camera unit 110, based on the information on vd determined by the user-interface provision unit 140.

Figure 5A:
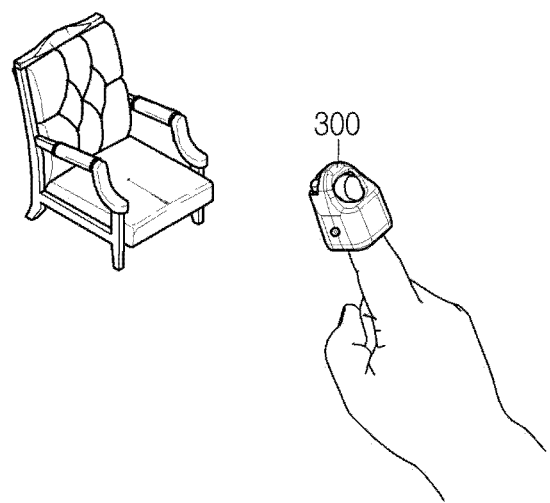
FIGS. 5A and 5B are views illustrating a user wearing an input device performing a drawing interaction with a virtual whiteboard through an input device according to an embodiment of the present invention.
Figure 5B:
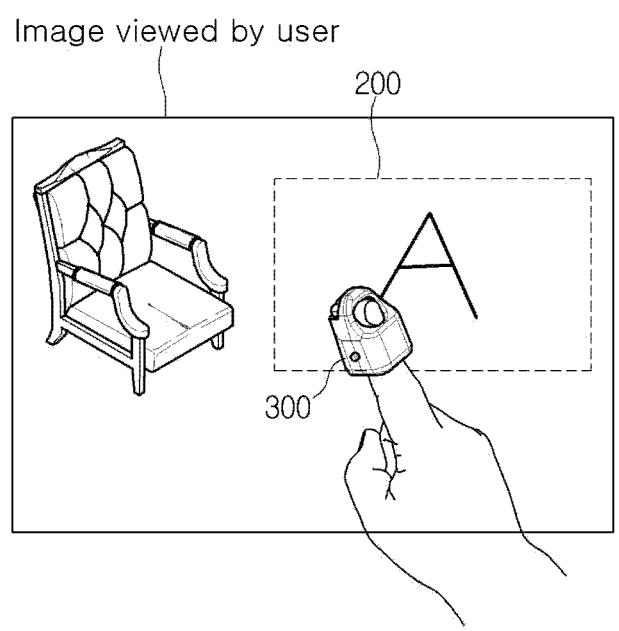

FIGS. 5A and 5B are views illustrating a user performing a drawing interaction with a virtual whiteboard 200 through the input device 300 according to an embodiment of the present invention.

The input device 300 according to the embodiment of the present invention may be a wearable device that is capable of being worn around at least part of the user's body. For example, in FIG. 5A, the input device 300 is a ring-type device that can be fitted around a user's finger, but the present invention is not limited thereto.

Referring to FIGS. 5A and 5B, the ring-type input device 300 may be operatively associated with the HMD 100, and may be configured to receive feedback data according to the interaction with the whiteboard 200 from the HMD 100, and provide the force feedback to a user based on the force feedback data, or to directly generate force feedback data and provide the force feedback to the user. For example, when a user writes a letter of 'A' onto the virtual whiteboard 200 using his/her finger, the input device 300 may provide a different level of vibrations to the user according to a relative distance between the user's finger and the whiteboard 200, or may provide a constant level of vibration to the user during writing of the letter of 'A' onto the whiteboard 200. However, the present invention is not limited thereto.

FIG. 5A is a view illustrating a user wearing the input device 300 drawing a letter of 'A' in a real space, and FIG. 5B is a view illustrating an image shown to the user through the HMD 100.

The control unit 160 of the HMD 100 can display the drawing action (action to write a letter of 'A') corresponding to a motion of the user's finger wearing the input device 300 onto the whiteboard 200 through the rendering unit 120. Here, the whiteboard 200 may be displayed in an opaque state, and the letter of 'A' may also be displayed in an opaque state correspondingly. Further, the whiteboard 200 may be displayed around a portion of an image viewed by a user, or the entire image a user views may be displayed as the whiteboard 200.

Although FIG. 5B shows an exemplary rectangular, planar whiteboard 200, the present invention is not limited thereto. An area or a virtual object interacting with the user wearing the input device 300 in a virtual space provided to the user through the HMD 100 may be defined as a whiteboard 200.

Further, although FIG. 5B shows that the user's hand wearing the input device 300 is exemplarily displayed in the image viewed by the user, the image may be processed such that the user's hand that does not wear the input device 300 is displayed.

Figure 6A:
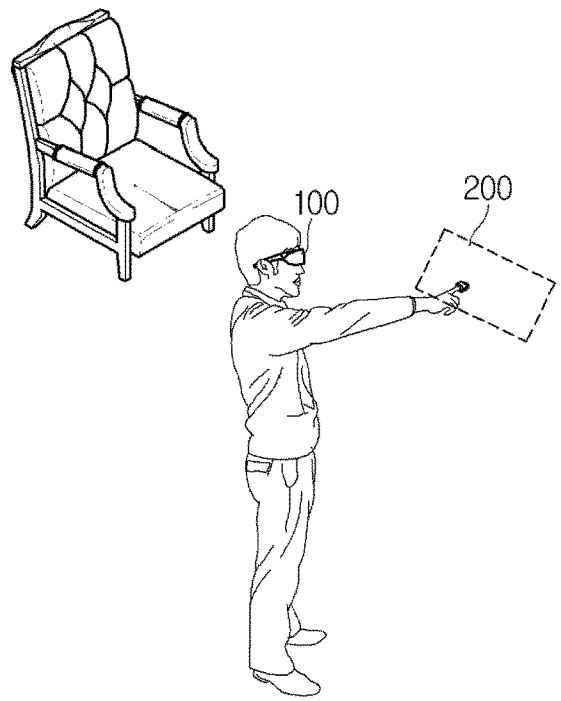
FIGS. 6A and 6B are views illustrating the user performing the interaction with the virtual whiteboard while turning his/her body to another direction.
Figure 6B:
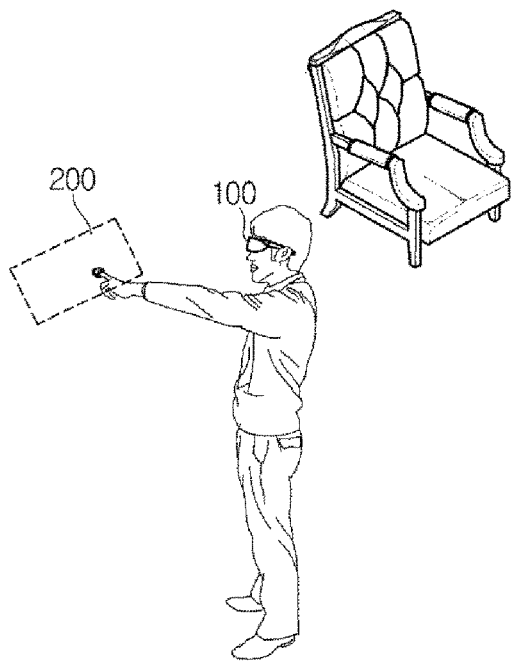

FIGS. 6A and 6B are views illustrating the user who wears the input device 300 performing an interaction with the virtual whiteboard 200 while turning his/her body to another direction.

FIG. 6A is a view illustrating the user wearing the HMD 100 and interacting with the whiteboard 200 while gazing at a right direction with reference to a sofa shown in the drawing, and FIG. 6B is a view illustrating the user wearing the HMD 100 and interacting with the whiteboard 200 while gazing at a left direction with reference to the sofa shown in the drawing. For reference, the whiteboard 200 illustrated in FIGS. 6A and 6B shows a virtual whiteboard 200 provided to a user.

Specifically, the control unit 160 of the HMD 100 may be configured to perform rendering of a motion of the input device 300 on the whiteboard 200 into an image corresponding to the input device 300 on the HMD screen, and, when it is detected that the motion of the input device 300 or an angle of the user's body changes over a predetermined threshold, control a position in a virtual space, in which the image corresponding to the whiteboard 200 is rendered, to change correspondingly in response to the detected change. For example, when the angle of the user's body changes by an amount of 180 degrees as shown in FIGS. 6A and 6B, the image corresponding to the whiteboard 200 may also be controlled to change by 180 degrees in the virtual space, so that a user can interact with the whiteboard while freely moving around.

While the present invention has been described with reference to specific configurations, such as elementary components, exemplary embodiments, and drawings, the description is provided merely for assisting more generalized understanding of the invention, so the present invention is not limited to the above-mentioned embodiments. An ordinary person skilled in the art may appreciate that such embodiments can be changed and modified into a variety of other forms through the description.

Therefore, it should be understood that the idea of the present invention is not defined as being limited to the exemplary embodiments, and such changes and modifications fall within the scope of the present invention defined by following claims and equivalents thereof.

What is claimed is:

1. A head-mounted device (HMD) for enabling a non-stationary user to perform a 3D drawing interaction in a mixed-reality space, the HMD comprising:

a frame section capable of being worn around a user's head or face;

a rendering unit providing a specified image;

a camera unit attached directly or indirectly to the frame section so as to pick up an image for rendering; and a control unit configured to, when the camera unit picks up an image of a specified marker, perform a calibration process based on position information of the image of the marker displayed on a screen of the HMD, the position information being obtained based on position information of user's eyes, position information of the screen of the HMD, position information of the camera unit, and position information of the marker, and to, when there is a motion of an input device for interaction with a virtual whiteboard provided through the rendering unit after the calibration process is performed, obtain position information of an image of the input device displayed on a virtual camera screen corresponding to the camera unit based on position information of the whiteboard, thereby supporting the interaction with the whiteboard, wherein, when the camera unit picks up the marker, the control unit performs the calibration process based on the position information of the image of the marker displayed on the screen of the HMD, the position information being obtained based on information (Qse) on the relation between an eye coordinate system corresponding to the user's eyes and a HMD screen coordinate system corresponding to the screen of the HMD, information (Tec) on the relation between the eye coordinate system and a camera coordinate system corresponding to the camera unit, and information (Tcm) on the relation between the camera coordinate system and a marker coordinate system corresponding to the marker, and wherein the information (Qse) on the relation between the eye coordinate system and the HMD screen coordinate system is information indicative of a perspective projection transform from the HMD screen coordinate system into the eye coordinate system.

2. The HMD according to claim 1, further comprising a user-interface provision unit configured to, when the image of the marker is displayed onto the screen of the HMD, set information on a first ratio of the size of the marker to the size of the image of the marker displayed onto the screen of the HMD, wherein a position of the image of the marker displayed onto the screen of the HMD is determined based on the information on the first ratio determined by the user-interface provision unit.

3. The HMD according to claim 1, further comprising a user-interface provision unit configured to, when the image of the input device is displayed onto the virtual camera screen corresponding to the camera unit, set information on a second ratio of the size of the input device to the size of the image of the input device displayed onto the camera screen, wherein a position of the image of the input device displayed onto the virtual camera screen corresponding to the camera unit is determined based on the information on the second ratio determined by the user-interface provision unit.

4. The HMD according to claim 1, wherein the input device is a device that is wearable around at least a portion of the user's body, wherein the control unit is configured to display a drawing action corresponding to a motion of the at least the portion of the user's body wearing the input device onto the whiteboard, or to provide haptic feedback according to interaction with the whiteboard to the user.

5. The HMD according to claim 1, wherein the HMD is an eyeglasses-type HMD, wherein the camera units are respectively installed directly or indirectly onto specified positions of left and right lenses of the eyeglasses-type HMD so that the camera units are moved along with a user's motion.

6. The HMD according to claim 1, wherein the control unit is configured to perform the calibration process based on position information of the image of the input device displayed onto a virtual camera screen, the position information being obtained based on perspective projection information (P) indicative of the relation between the virtual camera screen coordinate system corresponding to the camera unit and the whiteboard coordinate system, and rotation and translation information (Tcw) indicative of the relation between the camera screen coordination system and the whiteboard coordinate system.

7. A head-mounted device (HMD) for enabling a non-stationary user to perform a 3D drawing interaction in a mixed-reality space, the (HMD) comprising:

a frame section capable of being worn around a user's head or face;

a rendering unit providing a specified image;

a camera unit attached directly or indirectly to the frame section so as to pick up an image for rendering; and a control unit configured to, when the camera unit picks up an image of a specified marker, perform a calibration process based on position information of the image of the marker displayed on a screen of the HMD, the position information being obtained based on position information of user's eyes, position information of the screen of the HMD, position information of the camera unit, and position information of the marker, and to, when there is a motion of an input device for interaction with a virtual whiteboard provided through the rendering unit after the calibration process is performed, obtain position information of an image of the input device displayed on a virtual camera screen corresponding to the camera unit based on position information of the whiteboard, thereby supporting the interaction with the whiteboard, wherein, when the camera unit picks up the marker, the control unit performs the calibration process based on the position information of the image of the marker displayed on the screen of the HMD, the position information being obtained based on information (Qse) on the relation between an eye coordinate system corresponding to the user's eyes and a HMD screen coordinate system corresponding to the screen of the HMD, information (Tec) on the relation between the eye coordinate system and a camera coordinate system corresponding to the camera unit, and information (Tcm) on the relation between the camera coordinate system and a marker coordinate system corresponding to the marker, and wherein the information (Tcm) on the relation between the camera coordinate system and the marker coordinate system is information indicative of a rotation and translation transform between the camera coordinate system and the marker coordinate system.

8. The HMD according to claim 7, further comprising a user-interface provision unit configured to, when the image of the marker is displayed onto the screen of the HMD, set information on a first ratio of the size of the marker to the size of the image of the marker displayed onto the screen of the HMD, wherein a position of the image of the marker displayed onto the screen of the HMD is determined based on the information on the first ratio determined by the user-interface provision unit.

9. A head-mounted device (HMD) for enabling a non-stationary user to perform a 3D drawing interaction in a mixed-reality space, the HMD comprising:

a frame section capable of being worn around a user's head or face;

a rendering unit providing a specified image;

a camera unit attached directly or indirectly to the frame section so as to pick up an image for rendering; and a control unit configured to, when the camera unit picks up an image of a specified marker, perform a calibration process based on position information of the image of the marker displayed on a screen of the HMD, the position information being obtained based on position information of user's eyes, position information of the screen of the HMD, position information of the camera unit, and position information of the marker, and to, when there is a motion of an input device for interaction with a virtual whiteboard provided through the rendering unit after the calibration process is performed, obtain position information of an image of the input device displayed on a virtual camera screen corresponding to the camera unit based on position information of the whiteboard, thereby supporting the interaction with the whiteboard, wherein when the camera unit picks up the marker, the control unit performs the calibration process based on the position information of the image of the marker displayed on the screen of the HMD, the position information being obtained based on information (Qse) on the relation between an eye coordinate system corresponding to the user's eyes and a HMD screen coordinate system corresponding to the screen of the HMD, information (Tec) on the relation between the eye coordinate system and a camera coordinate system corresponding to the camera unit, and information (Tcm) on the relation between the camera coordinate system and a marker coordinate system corresponding to the marker, and wherein the information (Tec) on the relation between the eye coordinate system and the camera coordinate system is information indicative of a rotation and translation transform between the eye coordinate system and the camera coordinate system.

10. The HMD according to claim 9, further comprising a user-interface provision unit configured to, when the image of the marker is displayed onto the screen of the HMD, set information on a first ratio of the size of the marker to the size of the image of the marker displayed onto the screen of the HMD, wherein a position of the image of the marker displayed onto the screen of the HMD is determined based on the information on the first ratio determined by the user-interface provision unit.

11. A method of enabling a non-stationary user to perform a 3D drawing interaction in a mixed-reality space, using a head-mounted device (HMD worn by the user, the method comprising: at a control unit of the HMD,
(a), when a camera unit attached directly or indirectly to the HMD picks up an image of a specified marker for rendering, performing or supporting a calibration process based on position information of the image of the marker displayed on a screen of the HMD, the position information being obtained based on position information of user's eyes, position information of the screen of the HMD, position information of the camera unit, and position information of the marker; and
(b), when there is a motion of an input device for interaction with a virtual whiteboard provided through a rendering process after the calibration process is performed, obtaining position information of an image of the input device displayed on a virtual camera screen corresponding to the camera unit based on position information of the whiteboard, thereby supporting the interaction with the whiteboard,
wherein, when the camera unit picks up the marker, the step (a) performs the calibration process based on the position information of the image of the marker displayed on the screen of the HMD the position information being obtained based on information (Qse) on the relation between an eye coordinate system corresponding to the user's eyes and a HMD screen coordinate system corresponding to the screen of the HMD, information (Tec) on the relation between the eye coordinate system and a camera coordinate system corresponding to the camera unit, and information (Tcm) on the relation between the camera coordinate system and a marker coordinate system corresponding to the marker, and
wherein the information (Qse) on the relation between the eye coordinate system and the HMD screen coordinate system is information indicative of a perspective projection transform from the HMD screen coordinate system into the eye coordinate system.

12. The method according to claim 11, wherein the step (a) further comprises providing a user interface serving to, when the image of the marker is displayed onto the screen of the HMD, set information on a first ratio of the size of the marker to the size of the image of the marker displayed onto the screen of the HMD, wherein a position of the image of the marker displayed onto the screen of the HMD is determined based on the information on the first ratio determined by user input through the user interface.

13. The method according to claim 11, wherein the step (b) further comprises a user interface serving to, when the image of the input device is displayed onto the virtual camera screen corresponding to the camera unit, set information on a second ratio of the size of the input device to the size of the image of the input device displayed onto the camera screen,
wherein a position of the image of the input device displayed onto the virtual camera screen corresponding to the camera unit is determined based on the information on the second ratio determined by user input through the user interface.

14. The method according to claim 11, wherein the input device is a device that is wearable around at least a portion of the user's body,
wherein the step (b) performs displaying a drawing action corresponding to a motion of the at least the portion of the user's body wearing the input device onto the whiteboard, or providing a haptic feedback according to interaction with the whiteboard to the user.

15. The method according to claim 11, wherein the HMD is an eyeglasses-type HMD,
wherein in the step (b), the camera units are respectively installed directly or indirectly onto specified positions of left and right lenses of the eyeglasses-type HMD so that the camera units are moved along with a user's motion.

16. The method according to claim 11, wherein in the step (b), the control unit performs the calibration process for the whiteboard based on perspective projection information (P) indicative of the relation between the virtual camera screen coordinate system corresponding to the camera unit and the whiteboard coordinate system, and rotation and translation information (Tcw) indicative of the relation between the camera screen coordination system and the whiteboard coordinate system.

17. A method of enabling a non-stationary user to perform a 3D drawing interaction in a mixed-reality space, using a head-mounted device (HMD) worn by the user, the method comprising at a control unit of the HMD,
(a), when a camera unit attached directly or indirectly to the HMD picks up an image of a specified marker for rendering, performing or supporting a calibration process based on position information of the image of the marker displayed on a screen of the HMD, the position information being obtained based on position information of user's eyes, position information of the screen of the HMD, position information of the camera unit, and position information of the marker; and
(b), when there is a motion of an input device for interaction with a virtual whiteboard provided through a rendering process after the calibration process is performed, obtaining position information of an image of the input device displayed on a virtual camera screen corresponding to the camera unit based on position information of the whiteboard, thereby supporting the interaction with the whiteboard,
wherein, when the camera unit picks up the marker, the step (a) performs the calibration process based on the position information of the image of the marker displayed on the screen of the HMD, the position information being obtained based on information (Qse) on the relation between an eye coordinate system corresponding to the user's eyes and a HMD screen coordinate system corresponding to the screen of the HMD, information (Tec) on the relation between the eye coordinate system and a camera coordinate system corresponding to the camera unit, and information (Tcm) on the relation between the camera coordinate system and a marker coordinate system corresponding to the marker, and
wherein the information (Tcm) on the relation between the camera coordinate system and the marker coordinate system is information indicative of a rotation and translation transform between the camera coordinate system and the marker coordinate system.

18. The method according to claim 17, wherein the step (a) further comprises providing a user interface serving to, when the image of the marker is displayed onto the screen of the HMD, set information on a first ratio of the size of the marker to the size of the image of the marker displayed onto the screen of the HMD, wherein a position of the image of the marker displayed onto the screen of the HMD is determined based on the information on the first ratio determined by user input through the user interface.

19. A method of enabling a non-stationary user to perform a 3D drawing interaction in a mixed-reality space, using a head-mounted device (HMD) worn by the user, the method comprising at a control unit of the HMD,
  (a), when a camera unit attached directly or indirectly to the HMD picks up an image of a specified marker for rendering, performing or supporting a calibration process based on position information of the image of the marker displayed on a screen of the HMD, the position information being obtained based on position information of user's eyes, position information of the screen of the HMD, position information of the camera unit, and position information of the marker; and
  (b), when there is a motion of an input device for interaction with a virtual whiteboard provided through a rendering process after the calibration process is performed, obtaining position information of an image of the input device displayed on a virtual camera screen corresponding to the camera unit based on position information of the whiteboard, thereby supporting the interaction with the whiteboard,
  wherein, when the camera unit picks up the marker, the step (a) performs the calibration process based on the position information of the image of the marker displayed on the screen of the HMD, the position information being obtained based on information ($Qse$) on the relation between an eye coordinate system corresponding to the user's eyes and a HMD screen coordinate system corresponding to the screen of the HMD, information ($Tec$) on the relation between the eye coordinate system and a camera coordinate system corresponding to the camera unit, and information ($Tcm$) on the relation between the camera coordinate system and a marker coordinate system corresponding to the marker, and
  wherein the information ($Tec$) on the relation between the eye coordinate system and the camera coordinate system is information indicative of a rotation and translation transform between the eye coordinate system and the camera coordinate system.

20. The method according to claim 19, wherein the step (a) further comprises providing a user interface serving to, when the image of the marker is displayed onto the screen of the HMD, set information on a first ratio of the size of the marker to the size of the image of the marker displayed onto the screen of the HMD, wherein a position of the image of the marker displayed onto the screen of the HMD is determined based on the information on the first ratio determined by user input through the user interface.

* * * * *